Aug. 7, 1956    J. M. MILAN    2,757,761
SELF-ENERGIZING DISC TYPE WHEEL BRAKE
Filed Feb. 9, 1953    2 Sheets-Sheet 1

INVENTOR.
Joseph M. Milan
BY
*Lancaster, Allwine & Rommel*
Attorneys

Aug. 7, 1956  J. M. MILAN  2,757,761

SELF-ENERGIZING DISC TYPE WHEEL BRAKE

Filed Feb. 9, 1953  2 Sheets-Sheet 2

INVENTOR.
Joseph M. Milan
BY
Lancaster, Allwine & Rommel
Attorneys

United States Patent Office 2,757,761
Patented Aug. 7, 1956

2,757,761

SELF-ENERGIZING DISC TYPE WHEEL BRAKE

Joseph M. Milan, Palmer, Nebr., assignor to Milan Industries Company, Las Vegas, Nev., a corporation of Nevada Application February 9, 1953, Serial No. 335,796

1 Claim. (Cl. 188—73)

This invention relates to improvements in vehicle wheel brakes.

The primary object of the present invention is the provision of a vehicle disc type brake of the general nature of brakes shown in my U. S. Patents 2,266,059; 2,278,144; 2,280,599 and 2,304,368, but embodying varied improvements thereover which render the brake mechanism, as a whole, durable and effective in use without appreciable maintenance requirements, including costs.

A further object of this invention is the provision of a disc type vehicle brake including an improved disc construction and means for attaching the same to a wheel.

A further object of this invention is the provision of an improved disc type brake having an improved system of direct air cooling.

A further object of this invention is the provision of an improved brake construction which includes, in addition to the usual hydraulic and emergency manual brake applying means, an auxiliary braking means having a "servo" action of self-energizing effect, rendering the application of the brakes easier than with ordinary disc brakes; with augmented braking action when the wheel is rolling either forwardly or in reverse.

A further object of this invention is the provision of a disc type brake which includes both backing and pressure plates and improved means to regulate the normal effective spacing thereof.

Other objects and advantages of this invention will be apparent during the course of the following detailed description.

In the drawings wherein for the purpose of illustration is shown only a preferred embodiment of my invention:

Figure 1:
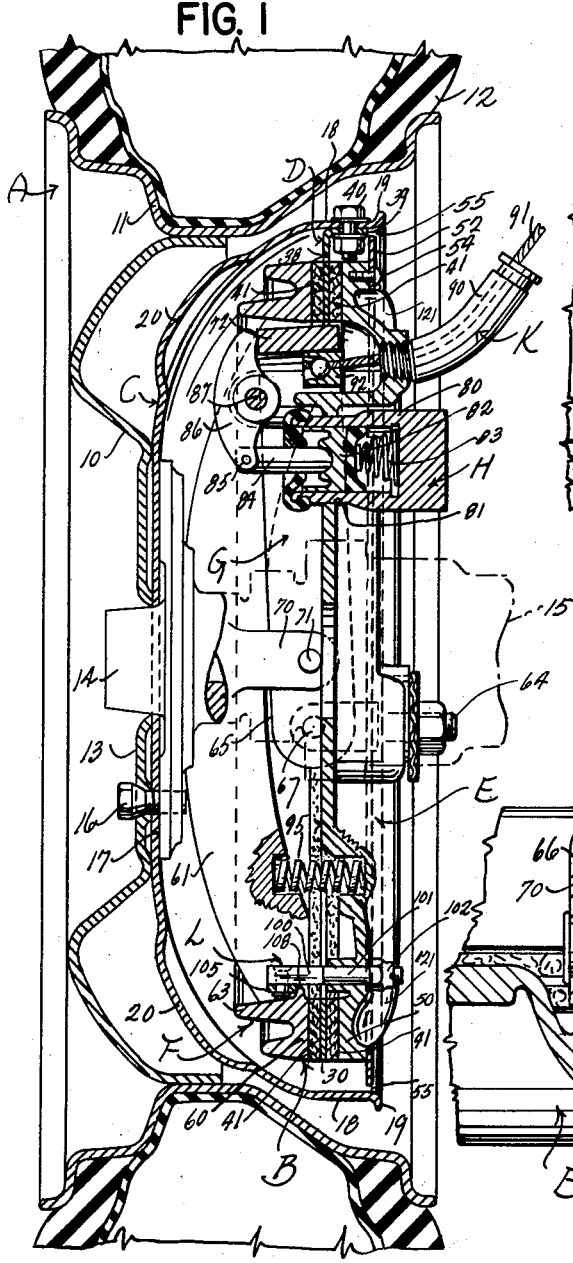
Figure 1 is a fragmentary vertical cross sectional view taken through a wheel structure upon which the improved brake mechanism is mounted; the view being taken substantially on the line 1—1 of Figure 2.
Figure 4:
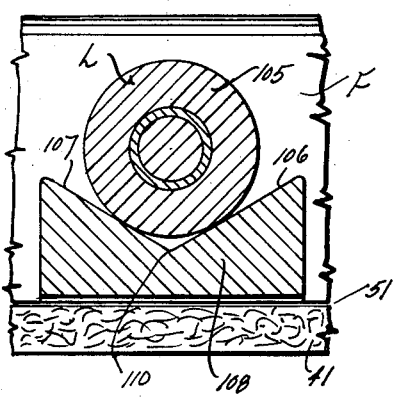
Figure 4 is an enlarged cross-sectional view taken substantially on the line 4—4 of Figure 2.

In the accompanying drawings, forming a part of this specification, and wherein similar reference characters designate corresponding parts throughout the several views, the letter A may generally designate a wheel upon which the brake construction B is mounted. The latter includes a casing or frame structure C; disc and brake lining construction D; backing plate structure E; pressure plate structure F; yoke construction for actuating the pressure plate construction F; hydraulic brake operating means H; emergency manual brake operating means K, and an improved auxiliary or servo braking means L.

The vehicle wheel construction A may include a body 10 having the usual rim 11 for receiving a tire 12. The central part 13 may be secured to a hub 14 mounted for rotation on an axle 15. The hub 14 may be conventionally attached to the body of the wheel as by bolts 16. Also, the axle construction 15 may vary widely in construction and in so far as its attachment to the backing plate construction of the brake mechanism is concerned. For that reason the axle construction has been shown in dot and dash lines in the drawings.

The brake construction B includes a supporting casing or frame C which in some of my patents has been referred to as an air induction member. It includes a central portion 17 secured by bolts 16, or by other means to the frame of the wheel structure, and it has a rim portion 18 outwardly flanged at 19, at its inner side. The casing structure 17 is dish shaped and receives the details of the braking and operating mechanism. Air scoops 20 are provided upon the induction or brake casing 17, with ports for scooping air, during wheel travel, into the chamber of the dish shaped casing C. The wheel is constructed so that the air has free inlet from the inner side thereof to the air scoops. If desired, the outer side of the wheel body may also be provided with air inlet means.

Figure 2:
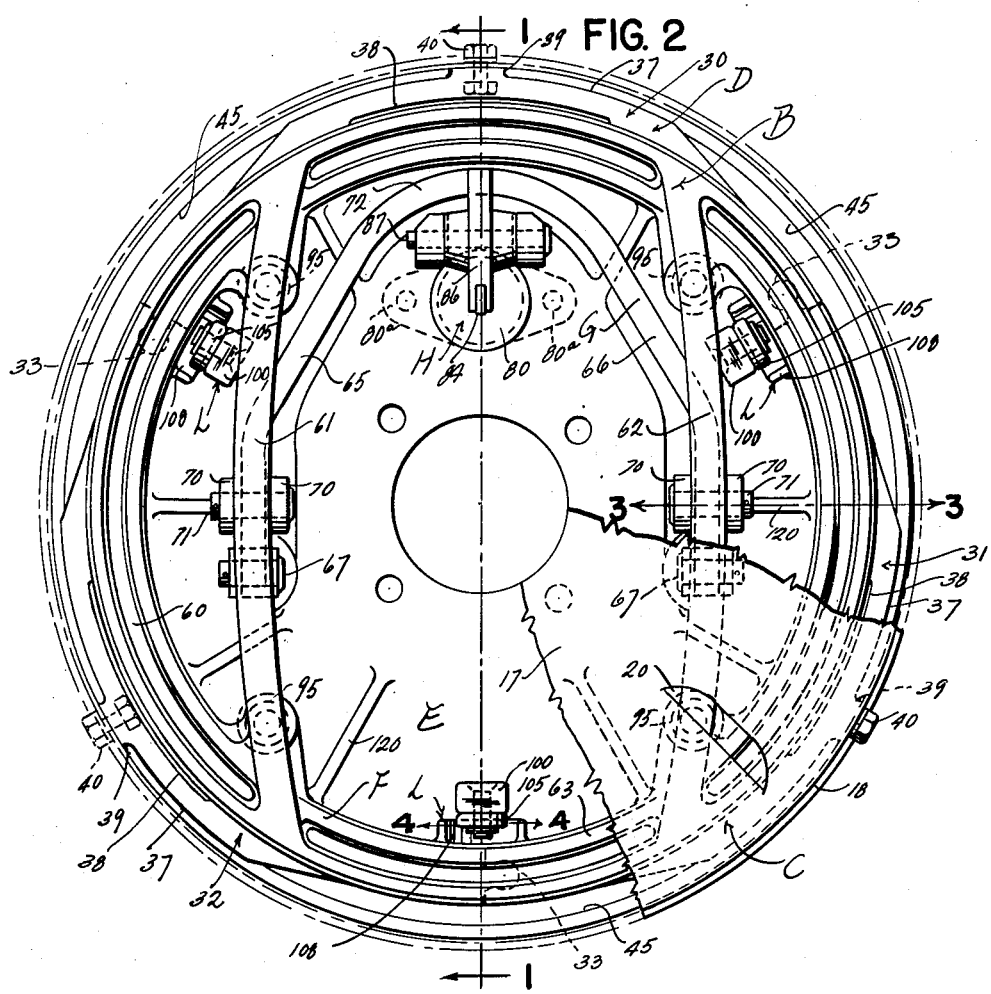
Figure 2 is a fragmentary view of the brake mechanism, with certain parts removed, looking from the outer side of the wheel inwardly.
Figure 5:
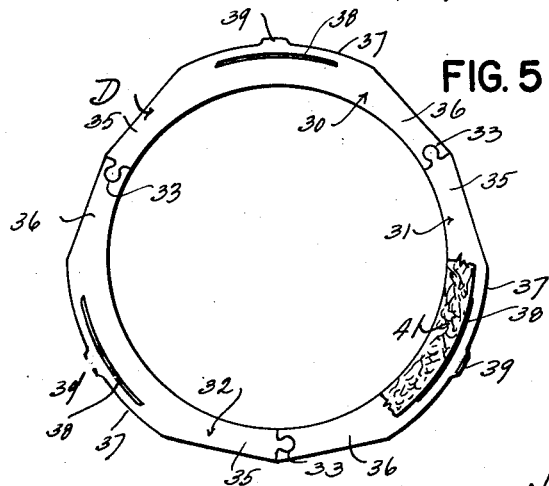
Figure 5 is a fragmentary view of an improved friction disc member for use in disc type brake structures.

Referring to the disc and its brake lining construction D, the same is not only of improved construction but has an improved mounting upon the casing C to provide for greater flexibility and resiliency, ease of alignment, economy of manufacture, and so that it will resist warpage and enable a more direct travel of air for brake cooling purposes. To that end the construction D, as best shown in Figures 1 and 5 of the drawings, includes a plurality of identically formed metal segments 30, 31 and 32, having interlocking tongue and groove connections 33 at the ends thereof disposed in such complementary relation that they provide a ring shaped brake or friction disc. The segments are stamped of sheet metal. Each segment 30, 31 and 32 includes the narrow end portions 35 and 36 and the intermediate wider portion 37. The latter has an arcuate slot 38 therethrough beyond the outer peripheral or terminal edges of the brake linings, to serve as air ducts or passageways. Centrally of the wider portions 37 there are provided laterally extending brake casing attaching flanges 39, shown in laterally extended position in Figure 1, adapted to receive bolts 40 for attachment of the disc to the rim portion 18 of the air induction or brake casing. If desired, the interlocking connections 33 of the segments may be welded or otherwise secured together, but preferably they are held together by the friction linings 41 secured at both sides of the ring shaped disc. The linings 41 may be secured to the disc as by riveting (not shown) or in any other approved manner. The linings 41 are ring shaped and of uniform diameter at the outer peripheral edges which lie flush with the inner edges of the arcuate passageways 38, so that even at the points of bolt application of the friction disc to the casing C there is provided means for air passage out of the casing C. Of course the narrower parts 35 at the ends of the segments of the brake disc are spaced, as is indicated at three locations 45 in Figure 2 of the drawings, from the inner surface of the brake disc attaching flange portion 18 of the casing C, to permit free air passage escape from the casing C.

The backing plate construction E may be made of any approved material, steel, aluminum, or magnesium alloy, and the same is fixedly secured to the axle 15 in any approved manner known in the art. It is a disc or plate and shaped to conform to support of various details hereinafter described. The outer peripheral edge of the braking flange 50 lies substantially flush with the outer peripheral edges of the brake linings 41; and it is normally spaced from the facing brake linings 41, as indicated at 51 in Figure 3 of the drawings.

A guard disc or shield 52, of ring shaped formation, is bolted as at 54 to the outer surface of the peripheral braking flange 50; the outer peripheral edge of the shield 52 being peripherally spaced from the inner surface of the rim 18 of the brake casing C, to provide an annular exit duct 55 for the passage of air from the braking casing. The air scoops 20 cause air enter into the brake chamber of the casing C, thoroughly contacting all interior portions of the brake and then the air is discharged through the relatively large passageways 45 above described, and through the ports 38, and through the circumferential passageway or port 55. This arrangement permits a more direct air passage and exit from the brake casing, and lessens the turbulency of air discharge, since the exit passageways are not as tortuous as those shown in the brake of my Patent 2,304,368.

The pressure plate construction F, includes the annular ring shaped brake applying portion 60 adapted to press against the lining 41 of the friction disc construction D. At its outer side the portion 60 is provided with a pair of yoke connecting arms or spokes 61 and 62, the ends of which are connected to the inner fin 63 of the annular portion 60 of the pressure ring. These arms are bowed outwardly and also laterally away from each other at their intermediate portions.

The operating lever or yoke construction G is shaped similar to a bail or stirrup, with the ends of the arm portions 65 and 66 pivotally connected at 67 to outwardly extending ears or lugs provided at the outer side of the backing plate E, by means of bolts 64 secured to the plate E.

The intermediate portions of the arms 61 and 62 of the pressure plate construction F are provided with inwardly extending lugs 70 which are pivoted at 71 with the arms 65 and 66 respectively of the yoke structure G between the pivots 67 of the yoke structure and the bight portion 72 thereof. The portion 72 is adapted to have the operating forces of the hydraulic and emergency brakes H and J applied directly thereto for moving the yoke. Movement of the yoke on its pivot axes will move the pressure plate in a line normal to the plane of the friction disc construction for uniform application of the plates upon the brake disc.

The details of the hydraulic and the emergency brake operating means H and K are shown and described in my U. S. Patent 2,266,059. The hydraulic brake mechanism H includes a cylinder 80 separate from the backing disc. It may be welded or otherwise secured as by means 80ª, to the plate E, within an opening 81 of the backing plate. The cylinder 80 has a piston structure 82 therein normally spring urged at 83. The chamber wherein the spring is located is adapted to receive the brake applying fluid by means of any arrangement of tubing (not shown) well understood in the art. The piston pin 84 extends outwardly for pivotal connection at 85 to one end of an operating lever 86. The latter is pivoted at 87 upon a shaft carried by lugs secured to the backing plate, and the opposite end of the lever operates against the bight portion 72 of yoke structure G. The hand or emergency brake structure K includes a suitable tube 90 mounted on plate E, through which passes an operating cable 91 secured at 92 to the bight portion of the yoke.

Figure 3:
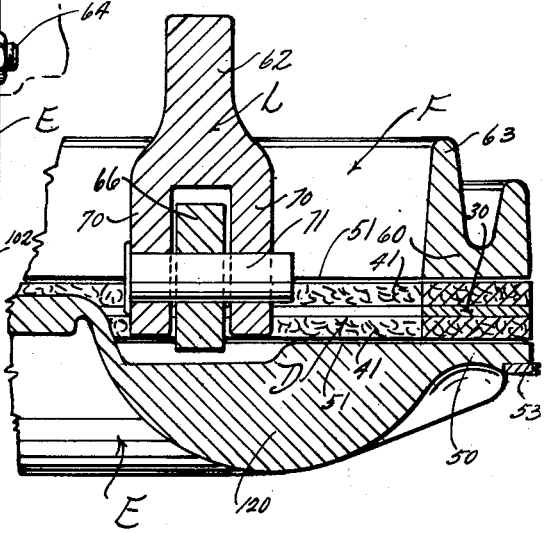
Figure 3 is an enlarged cross sectional view taken substantially on the line 3—3 of Figure 2.

I have an improved spring arrangement for normally forcing the pressure plate away from the backing plate. It consists of positioning four springs 95 between the backing plate construction E and the pressure plate construction F, socketed at their outer ends in the arms 61 and 62 of the pressure plate construction and at their inner ends in the backing plate, as shown, for one of the springs, in Figure 1. The location of the four springs provides for uniformity of pressure action (see Figure 2). These springs each exerts a force of substantially 50 pounds upon the plates E and F. The normal position of the plates E and F, with respect to the brake lining, and the spaced positioning thereof, is shown in Figure 3.

Referring to the "servo" brake or auxiliary brake construction, designated at L in the drawings, the same functions to provide a means to limit the maximum spaced distance of the backing and pressure plates, against normal action of the springs 95, and also serves and assists the normal brake application with ease of brake operation and a self energizing effect, both upon forward and reverse movements of the wheels. To that end, at each of three locations around the brake construction, preferably at 120° apart, I provide one of these "servo" appliances. Each of them consists of a supporting shank 100 including a reduced shaft 101 screw threaded at its inner end for receiving a shake proof nut 102, so that the shank 100 extends outwardly beyond the backing plate construction E and into the area of the opening through the pressure plate, immediately adjacent to the inner circumferential surfacing of the ring portion 60. Each of the shanks 100 supports a roller 105, adapted to act upon the inclined plane surfaces 106 and 107 of a cam member 108. The latter may be integral or otherwise fixedly secured to the inner surfacing of the ring shaped portions 60 of the pressure plate, at each of the three locations above mentioned. The periphery of the roller 105 acts on the surfaces 106 and 107, tending to limit the extreme positions of the backing and pressure plate under action of the springs which tend to force them apart. It will be noted that the cam surfaces 106 and 107 are in angular relation. The degree of the angle may be made to suit operating circumstances, but in the drawings the angle between the planes of these surfaces is 120°. The surfaces 106 and 107, as to the planes thereof, are in exact V-shaped relation with the apex point 110 out of contact with the periphery of the roller 105, so that the roller is in position to normally force the follower plate inwardly upon rotation movement of the wheel either forward or reverse. The additional braking action given by this "servo" effect augments the normal braking action of the hydraulic and emergency brake operating means, and acts upon the follower plate for prompt and effective braking application. There will be some slight rotational movement of the pressure plate construction relative to the braking plate construction to provide the auxiliary braking action.

The backing plate may be provided with reinforcing and cooling fins 120 on its outer side, and cooling fins 121 on the inner sides thereof similar in nature and purpose to those shown in my Patent 2,304,368.

The terminology used herein, such as "disc," "plate," "yoke," etc. is intended to embrace members provided to serve the respective purposes herein given for said parts, independent of whether they are actually and within strict terminology shaped as plates, discs, etc.

Various changes in the shape, size, and arrangement of parts may be made for the form of the invention herein shown and described, without departing from the spirit of the invention herein disclosed or the scope of the claim.

I claim:

In a brake construction the combination of a supporting framework, a non-rotatable backing plate, a pressure plate, a friction disc construction mounted upon the casing located between said backing plate and pressure plate, operating means for moving the pressure plate towards the backing plate, and roller means fixedly carried by the backing plate, said pressure plate having a portion thereon adapted to be engaged by the roller means to limit the transverse movement of said plates away from each other, said portion upon which the roller means operates being provided with inclined surfacing along which the roller means operates incidental to relative rotational movement between said plates for moving the pressure plate towards the backing plate.

References Cited in the file of this patent

UNITED STATES PATENTS

| | | |
|---|---|---|
| 1,673,713 | Smith | June 12, 1928 |
| 2,099,489 | Lambert | Nov. 16, 1937 |
| 2,237,624 | Oldham | Apr. 8, 1941 |
| 2,266,059 | Milan | Dec. 16, 1941 |
| 2,278,144 | Milan | Mar. 31, 1942 |
| 2,280,599 | Milan | Apr. 21, 1942 |
| 2,285,257 | Dodge | July 2, 1942 |
| 2,304,368 | Milan | Dec. 8, 1942 |
| 2,331,259 | Whitten | Oct. 5, 1943 |
| 2,371,158 | Eby | Mar. 13, 1945 |
| 2,422,713 | Benson | June 24, 1947 |

FOREIGN PATENTS

| | | |
|---|---|---|
| 690,251 | France | Nov. 20, 1929 |